Sept. 1, 1936.   D. C. CORSON   2,052,698
VEHICLE SPRING SUSPENSION
Filed July 8, 1935
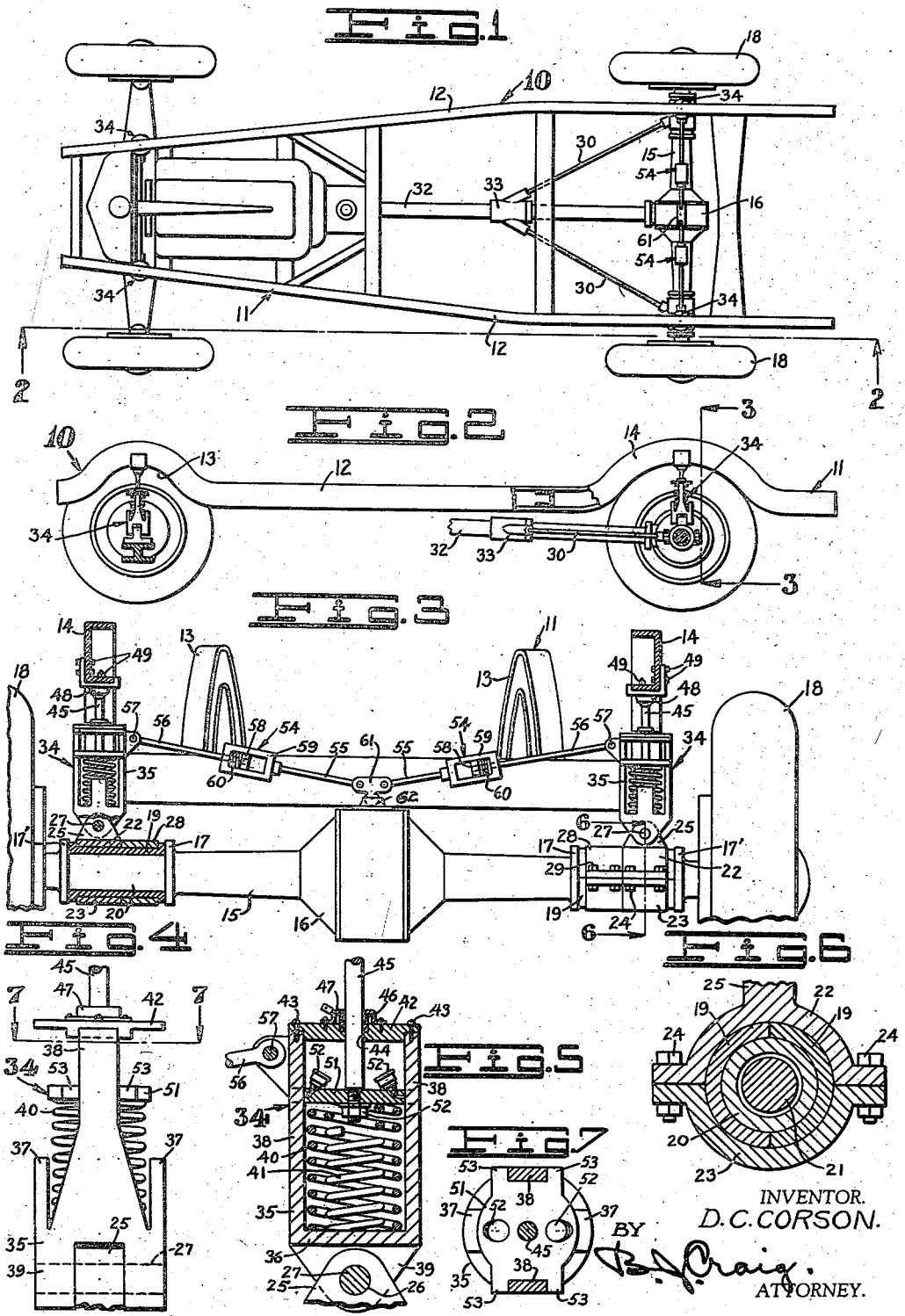
INVENTOR.
D. C. CORSON.
BY
ATTORNEY.

Patented Sept. 1, 1936

2,052,698

UNITED STATES PATENT OFFICE 2,052,698

VEHICLE SPRING SUSPENSION

David C. Corson, Pasadena, Calif.

Application July 8, 1935, Serial No. 30,308

9 Claims. (Cl. 267—60)

This invention relates to vehicle spring suspension.

The general object of the invention is to provide an improved spring suspension for vehicles such as automobiles.

A further object of the invention is to provide an improved spring suspension wherein a vehicle body is resiliently supported on a plurality of coil springs.

A more specific object of the invention is to provide a spring mounting for vehicles wherein a coil spring member is mounted and is pivotally movable on the vehicle axle and wherein novel means is provided for connecting this spring member to the vehicle.

Other objects of the invention will be apparent from the description taken in connection with the accompanying drawing, wherein:

Fig. 1 is a top plan view of a chassis of a vehicle showing my invention applied thereto;

Fig. 2 is a section taken on line 2—2 of Fig. 1;

Fig. 3 is a section taken on line 3—3 of Fig. 2 with parts broken away to more clearly show details of the construction;

Fig. 4 is a side elevation of the spring support;

Fig. 5 is a central sectional view through the spring support;

Fig. 6 is a section taken on line 6—6 of Fig. 3, and

Fig. 7 is a section taken on line 7—7 of Fig. 4.

Referring to the drawing by reference characters, I have shown my invention as embodied in a vehicle indicated generally at 10.

As shown this vehicle includes a frame 11 which has longitudinal side members 12 thereon. These side members at the front are provided with a curved portion 13 and at the rear with a curved portion 14, the purpose of which will be apparent as the description proceeds.

My invention may be applied with equal facility to either the front axle or the rear axle and as shown in Fig. 3 it is applied to the rear axle 15 which includes the differential housing 16.

Adjacent each of the two ends of the axle 15 I provide an inner flange 17 and an outer flange 17'. Positioned outward from the flanges 17 I provide the customary wheels 18. A split bushing 19 is positioned about a reduced portion 20 of the axle 13. As shown in Fig. 6 the drive axle 21 extends through to axle 13 and the portion 20.

About the outer portion of each of the bushings 19 I provide a pair of bearing members 22 and 23 which are secured together by suitable bolts 24. The bearing members 22 each include an upwardly extending lug 25 which is apertured as at 26 to receive a pin 27 for a purpose to be hereinafter described.

Positioned about the bushing 19 and inwardly from the bearing members 22 and 23 are provided on each end of the axle 13 a pair of collar members 28 which are clamped to the bushing 19 by bolts 29. Secured to each collar member 28 I provide a rod 30. The forward ends 31 of the rods 30 are secured to the torque tube 32 as at 33.

Adjacent each end of the axle I provide spring assemblies 34. As shown these assemblies each include a spring support 35 which comprise a bottom 36, a pair of upstanding tongues 37, a pair of upstanding arms 38, and a pair of depending lugs 39 which are apertured to engage the pin 27 previously described.

Positioned between the arms 38 and between the lugs 37 is a coiled spring 40 in which is positioned a second coiled spring 41 of reduced diameter. The upper ends of the arms 38 are secured to a head 42 by screws 43. The head 42 is apertured as at 44 to slidably receive a connecting rod 45. An oiling pad 46 is secured by a clamp 47 to the head 42 to keep the rod 45 lubricated.

The upper end of the rod 45 is secured to a ball joint 48 which in turn is secured as by bolts 49 to the portion 14 of the frame 10. The lower end of the rod includes a reduced threaded portion 50 on which a spring engaging plate 51 is positioned. The plate 51 is secured in position by a nut 52. Oil cups 52 are provided in the plate 51 to provide lubrication for the edges thereof.

As shown in Figs. 4 and 7 the plate 51 is round in shape and includes on either side thereof a pair of ears 53 which engage the sides of the arms 38. (See Fig. 4.)

In order to resiliently retain the spring assemblies 34 in an upright position I provide a pair of tie rods 54 each of which includes an inner rod 55 and an outer rod 56. One end of each of the rods 56 is rotatively secured to a lug 57 mounted on the inner arm 38 of the spring assembly 34. The other ends of the rods 56 terminate in enlarged heads 58 which are slidably positioned within cages 59 which in turn are secured to the outer ends of the rods 55. Springs 60 are positioned within the cages 59 and about the rods 56. These springs 60 engage the head 58 and the cage 59 to produce tension between the rods 55 and 56. The inner ends of the rods 55 are rotatably secured to an anchor member 61 which in turn is positioned in a ball joint 62 mounted on the differential housing 16.

In operation when the vehicle is driven forward by the wheels through the medium of the axle 13, the torque tube 32 and its associated rods 30, the frame rides on the spring assemblies 34 which are resiliently held in a substantially vertical position by the tie rods 30. When one of the wheels strikes an obstruction the springs 40 and 41 at that side are compressed and the upper portion of the spring assembly swings outwardly to a very slight extent until the spring 60 in the associated tie rod 54 is compressed. At the same time the other tie rod is slightly pulled through the anchor member 61 and thus the spring assembly at the side opposite the obstruction is pulled inwardly slightly from the vertical. This operation results in a very effective controlled springing.

From the foregoing description it will be apparent that I have invented a novel spring suspension means for vehicles which is simple in construction and operation and is highly efficient.

Having thus described my invention I claim:

1. In a spring support for a vehicle including a frame having longitudinal side members, an axle, a differential housing and a torque rod, a pair of spring assemblies, each of said spring assemblies including a support, means to pivotally mount one of said supports adjacent each end of the axle to move laterally of the vehicle, said spring assemblies each including a compression spring, means to hold the compression spring in the support, rods connecting the axle to the torque rod, means connecting said spring assemblies to said frame, brace means for the spring assemblies, said brace means each including a resilient portion and being disposed whereby said assemblies are normally vertical and are resiliently restrained from moving outwardly from the vertical laterally of the vehicle by the connecting means.

2. In a spring support for a vehicle including a frame having longitudinal side members, an axle, a differential housing and a torque rod, a pair of spring assemblies, each of said spring assemblies including a support, means to mount one of said supports adjacent each end of the axle to move laterally of the vehicle, said spring assemblies each including a coiled compression spring, means to hold the coiled compression spring in the support, rods connecting the axle to the torque rod, means connecting said spring assemblies to said frame, brace means for the spring assemblies, said brace means including slip joints, said slip joints being disposed whereby said assemblies are normally substantially vertical and are limited to slight movement from the vertical laterally of the vehicle by the connecting means.

3. In a spring support for a vehicle including a frame having longitudinal side members, and an axle, a pair of spring assemblies, each of said spring assemblies including a support, means to mount one of said supports adjacent each end of the axle to move laterally of the vehicle, said spring assemblies each including a compression spring, means to hold the compression spring in the support, means connecting said spring assemblies to said frame, brace means for the spring assemblies, said brace means including slip joints, said slip joints being disposed whereby said assemblies are normally substantially vertical and are limited to slight movement from the vertical laterally of the vehicle by the connecting means.

4. The combination of a vehicle including a frame having side members, an axle, a differential housing and a torque tube, a split bushing mounted on said axle, a pair of bearings clamped to said bushing, a pair of rods, one connected at one end to a bushing and at the other end to the torque tube, a second pair of bearings loose on said bushing, said second bearings each having a radially projecting lug thereon, a pair of spring supports each pivotally secured to one of said lugs to move laterally of the vehicle, a head secured to each support, a spring disposed in each support, a plate engaging the top of each spring, a connecting rod secured to each spring engaging plate, means to secure each connecting rod to a side member, a swiveled bracket on said housing, a link connecting said bracket to each support, said links including a slip joint arranged to allow limited inward and outward movement from the vertical laterally of the vehicle.

5. In combination with a vehicle including a frame having side members and an axle housing extending transversely of said side members and a torque tube member connected at one end to said axle, said axle housing having a bearing portion thereon adjacent each of said side members, a split bushing mounted on each of said bearing portions, a collar clamped to each of said bushings, a second collar loosely mounted on each of said bushings, a spring support pivoted to each of said second collars for pivotal movement, a coil spring in each of said supports, said supports including means to retain said springs therein, a plate positioned on each of said springs, a rod secured at one end to each of said plates, the opposite ends of said rods being universally secured to the adjacent one of said side members, and brace means connecting each of said supports to said housing.

6. In combination with a vehicle including a frame having side members and an axle housing extending transversely of said side members and a torque tube member connected at one end to said axle, said axle housing having a bearing portion thereon adjacent each of said side members, a split bushing mounted on each of said bearing portions, a collar clamped to each of said bushings, a second collar loosely mounted on each of said bushings, a spring support pivoted to each of said second collars for pivotal movement transversely of said side members, a coil spring in each of said supports, said supports including means to retain said springs therein, a plate positioned on each of said springs, a rod secured at one end to each of said plates, the opposite ends of said rods being universally secured to the adjacent one of said side members, brace means connecting each of said supports to said housing, said brace means including means to limit the outward and inward swing of said supports laterally of the vehicle, rods secured at one end to each of said first collars and at their opposite ends to said torque tube member.

7. The combination of a vehicle including a frame having side members, an axle, a differential housing and a torque tube, a split bushing mounted on said axle, a pair of bearings clamped to said bushing, a pair of rods, one connected at one end to a bushing and at the other end to the torque tube, a second pair of bearings loose on said bushing, said second bearings each having a radially projecting lug thereon, a pair of spring supports each pivoted to one of said lugs to move laterally of the vehicle, said supports each including a pair of vertically extending tongues, a pair of ears on each support spaced between said tongues, a head secured to each pair of ears, a spring disposed in each support and confined by said ears and tongues, a plate engaging the top of each spring, ears on said plate slidably engaging the tongue, a connecting rod secured to each spring engaging plate, means to secure each connecting rod to a side member, each support having a lug thereon, a swiveled bracket on said housing, a link connecting said bracket to each support lug, and means to adjust the length of said connecting means, said connecting means including a slip joint arranged to allow inward and outward movement of said supports laterally of the vehicle.

8. The combination of a vehicle including a frame having side members, an axle, a differential housing and a torque tube, a split bushing mounted on said axle, a pair of bearings clamped to said bushing, a pair of rods, one connected at one end to a bushing and at the other end to the torque tube, a second pair of bearings loose on said bushing, said second bearings each having a radially projecting lug thereon, a pair of spring supports each having a bifurcated lower portion pivoted to one of said lugs, said pivots being parallel to said side members, said supports each including a pair of vertically extending tongues diametrically arranged, a pair of ears on each support diametrically arranged and spaced between said tongues, a head secured to each pair of ears, a spring disposed in each support and confined by said ears and tongues, a plate engaging the top of each spring, ears on said plate slidably engaging the tongues, a connecting rod secured to each spring engaging plate, said heads each having a hole therein through which a connecting rod passes, means to secure each connecting rod to a side member, each support having a lug thereon, a swiveled bracket on said housing, a link connecting said bracket to each support lug, and means to adjust the length of said connecting means, said connecting means including a slip joint arranged to allow limited inward and outward movement of said supports laterally of the vehicle.

9. In combination with a vehicle including a frame having side members and an axle housing extending transversely of said side members and a torque tube member connected at one end to said axle, a spring support pivotally secured on each end of said axle housing to move laterally of the vehicle, a coil spring on each of said supports, means whereby said side members are supported by said springs, and means connecting said supports to each other for simultaneous movement, said connecting means being disposed above the axle housing.

DAVID C. CORSON.